United States Patent [19]
Corbo et al.

[11] Patent Number: 4,898,217
[45] Date of Patent: Feb. 6, 1990

[54] DEVICE FOR METERING THE MASS OF NATURAL GAS FOR FUELING MOTOR VEHICLES

[76] Inventors: Leonard Corbo; Carlo Draghi, both of Via Savona 97, Milan 20144, Italy

[21] Appl. No.: 177,106

[22] Filed: Apr. 4, 1988

[51] Int. Cl.⁴ .............................................. F17C 13/02
[52] U.S. Cl. ...................... 141/83; 141/102; 141/197; 141/248; 222/56; 222/58
[58] Field of Search ............ 141/83, 98, 197, 230, 141/102, 104, 248, 105; 222/56, 58, 61; 137/403; 177/209; 123/525, 526; 73/223, 861

[56] References Cited

U.S. PATENT DOCUMENTS

| 920,942 | 5/1909 | Fleming | 177/250 |
|---|---|---|---|
| 2,984,386 | 5/1961 | White | 222/58 |
| 3,099,368 | 7/1963 | Turner et al. | 222/58 |
| 3,419,053 | 12/1968 | Tanner | 141/248 |
| 3,536,109 | 10/1970 | Ginsburgh | 141/98 |
| 3,799,218 | 3/1974 | Douglass | 141/197 |
| 3,874,428 | 4/1975 | Golay | 141/95 |
| 4,266,691 | 5/1981 | Wolwowicz | 141/248 |
| 4,582,100 | 4/1986 | Poulsen | 141/83 |
| 4,613,060 | 9/1986 | Ulbrich et al. | 141/248 |
| 4,638,875 | 1/1987 | Murray | 177/187 |

Primary Examiner—Ernest G. Cusick
Assistant Examiner—J. Casimer Jacyna
Attorney, Agent, or Firm—Bucknam and Archer

[57] ABSTRACT

The device comprises at least two metering chambers which are so counter weighed as to be in a balanced condition on corresponding yoke members, each chamber bearing on a measuring cell, the two chambers operating, alternatively, with a loading step from the gas storage tank and a fueling step for filling the motor vehicle gas cylinders, under the control of a programmed computer or processor designed for driving a plurality of solenoid valves included in the gas supply circuit.

2 Claims, 2 Drawing Sheets

DEVICE FOR METERING THE MASS OF NATURAL GAS FOR FUELING MOTOR VEHICLES

BACKGROUND OF THE INVENTION

The present invention relates to a device for metering the mass of natural gas during a motor vehicle fueling operation.

As is known, the problem of metering natural gas, such as methane, for fueling gas cylinders for motor vehicles is solved by using different metering methods such as volumetric methods, pressure differential methods, mass or weight metering methods and the like.

Of the above mentioned methods, in particular, the first two methods require that rather complex metering devices be used, since several parameters susceptible to undesirably vary the density of the gas being supplied must be continuously monitored.

Moreover the known presently available gas metering devices do not provide for the possibility of metering the weight of the combustible gas being supplied.

SUMMARY OF THE INVENTION

Accordingly, the main object of the present invention is to overcome the above mentioned drawbacks by providing a gas metering device which is very simple and reliable.

Another object of the present invention is to provide such a gas metering device which is able of precisely evaluating the weight and cost of the gas being supplied to a motor vehicle during a fueling operation.

Still another object of the present invention is to provide a metering device which is moreover adapted to meter the weight of liquid fuels and/or materials.

According to one aspect of the present invention, the above mentioned objects, as well as yet other objects, which will become more apparent hereinafter, are achieved by a gas metering device characterized in that it comprises at least two metering chambers, said metering chambers being so counterweighed as to be balanced on corresponding yoke members and bearing each on a load measuring cell, said chambers being adapted to alernatively operate with a filling step in which one of said chambers is filled from a storage tank and a fueling step in which the other of said chambers fuels the cylinders of a motor vehicle, processor means being further provided for driving a plurality of solenoid valves so as to control the operation of said chambers.

BRIEF DESCRIPTION OF THE DRAWINGS

Further characteristics and advantages of the gas mass or weight metering device according to the present invention will become more apparent hereinafter from the following detailed description of a preferred embodiment thereof, which is illustrated, by way of a not limitative example in the figures of the accompanying drawings, where.

DESCRIPTION OF THE PREFERRED EMBODIMENT

Figure 1:
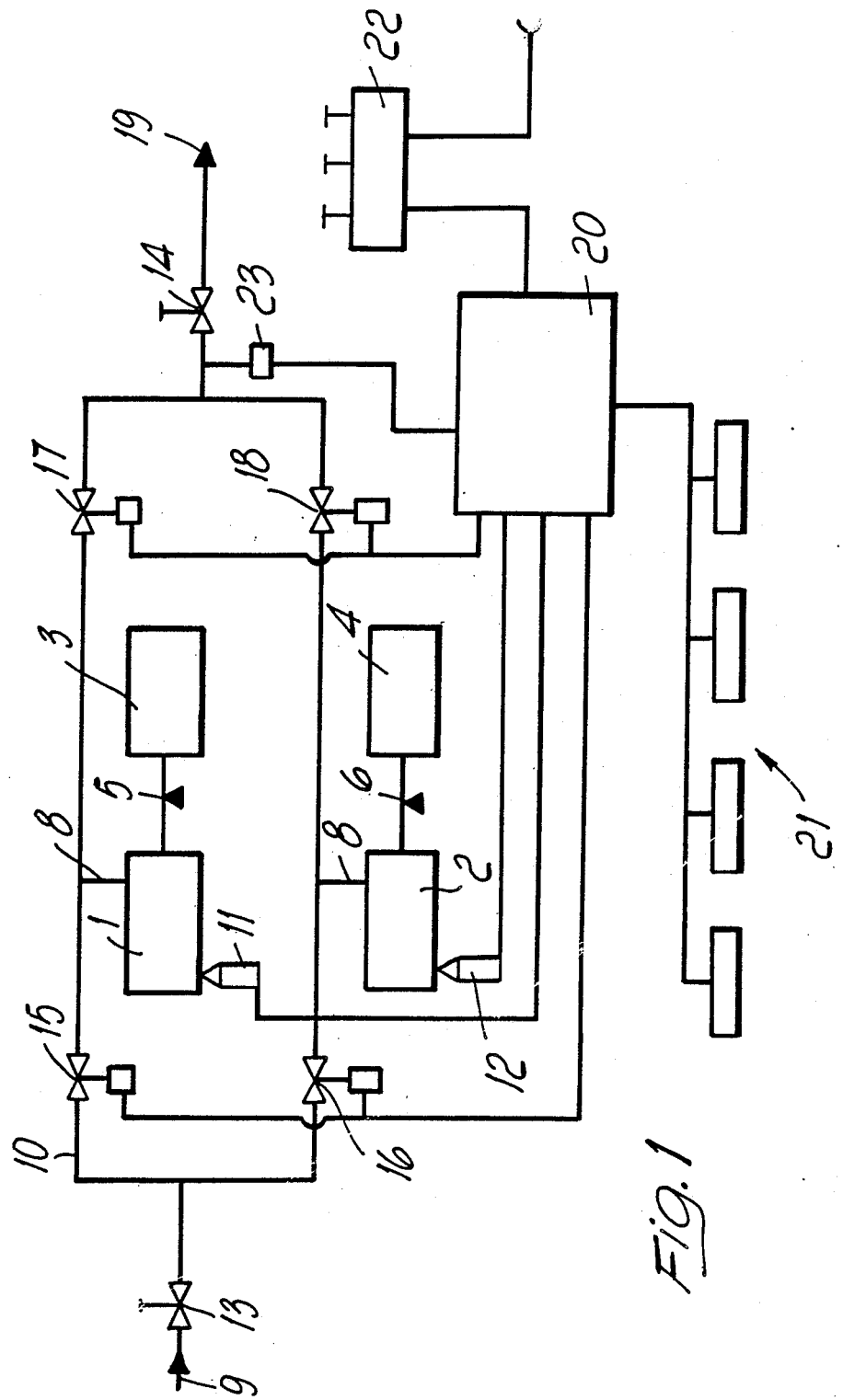
FIG. 1 is a schematic diagram illustrating the metering device according to the present invention.

With reference to the figures of the accompanying drawing, the gas mass or weight metering device according to the present invention comprises at least two metering chambers 1 and 2 the volumes of which are proportional to the device flow rate and which are suitably counterweighed by weights 3 and 4 so as to be held in a perfectly balanced condition on yoke members 5 and 6. As shown for example in FIG. 2 for the yoke member 5 (and likewise the yoke member 6), this yoke 5 consists of a bottom fixed member 5', which is affixed by screws 5" to the metering device frame 5''', and a top blade oscillating member 50 which is affixed by screws 51 to a plate 52 rigid with a threaded rod 53 on which the weight 3 is adjustably mounted.

The balance weights can be displaced along their longitudinal axes by means of a screw type of coupling and can be locked in the balanced condition by means of a ring nut 7 adapted to engage on the outer surface of said balance weights.

In this connection it should be pointed out that the metering chambers are so designed and arranged as to be able of resisting against preset operation pressures and that the fuel gas enters said chambers and exits therefrom through a single flexible hose 8 which is so arranged as not to alter the balanced status of said chambers.

It should be moreover apparent that the mentioned counterweights can be replaced, if desired, by a parallelogram linkage or suitable spring members.

As is shown, said metering chambers are supplied, through the fitting 9 and supply circuit 10, from a gas storage tank (not specifically shown) with a high inner pressure.

Figure 2:
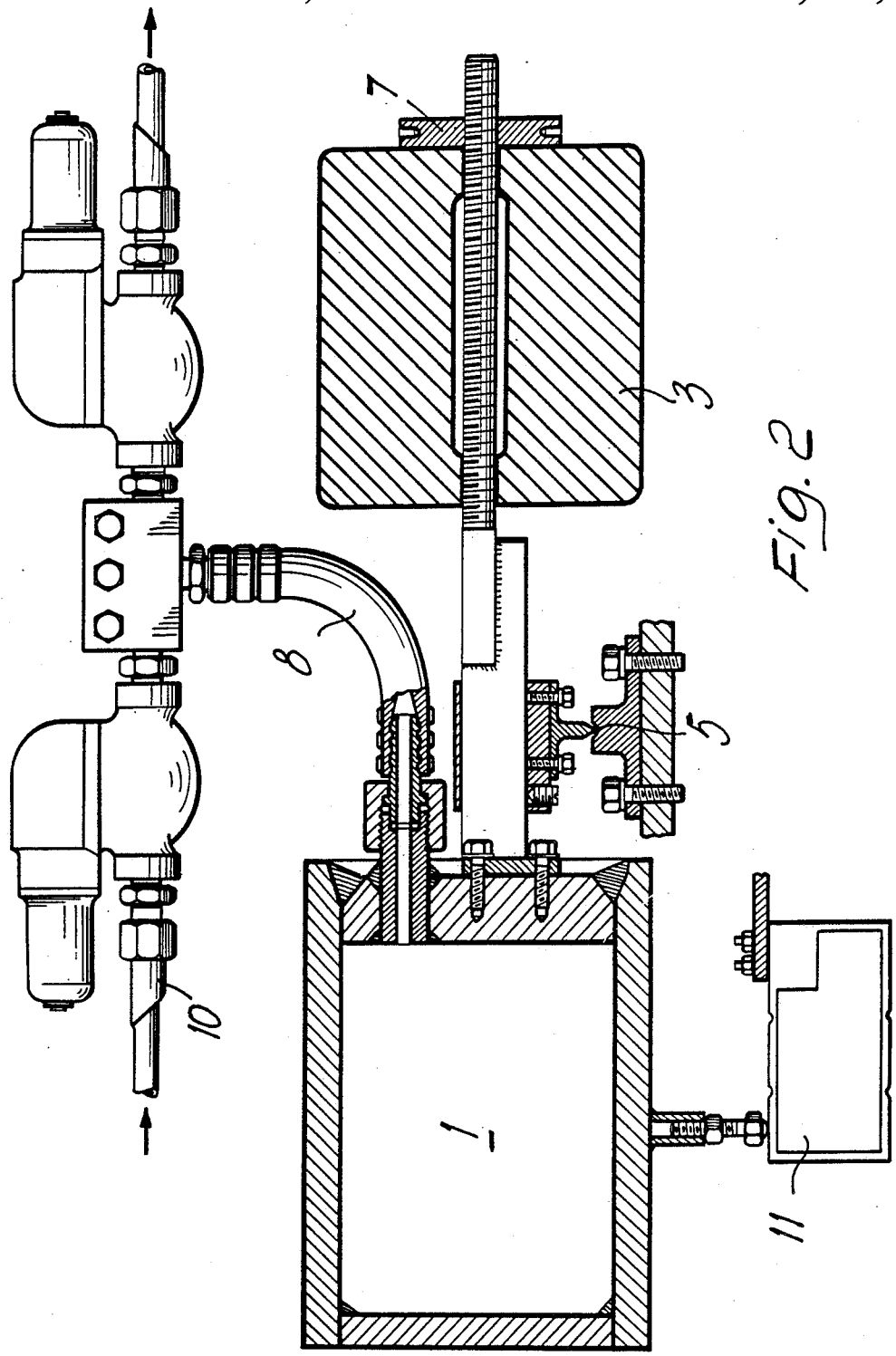
FIG. 2 shows a practical embodiment of one of the metering chambers of this device.

Along the axis of the bottom generatrix of the metering chambers, moreover, there are provided corresponding load measuring cells, indicated respectively at 11 (also coupled to the device frame 5''') and 12, which have a parallelogram arrangement and a linear response. As shown in FIG. 2, the metering chamber 1 (and likewise the metering chamber 2) is coupled to its corresponding load measuring cell 11 through a movable coupling assembly 11', which can be adjusted in height by the bolt assembly 11", for transmitting the mass increase and mass decrease as the chamber 1 (or 2) is respectively filled or emptied.

These load measuring or metering cells, in particular, can be displaced, by means of a suitable sliding coupling assembly 55 coupling the load measuring cell 11 with the device frame 5", so as to provide, during the metering device calibrating step, a precise electric signal corresponding to the actual weight bearing thereon.

Alternatively a load measuring cell can be provided able of bearing the weight of the related chamber, to be considered as a tare, and having a sufficient weighing sensibility.

Two manual valves 13 and 14 are arranged in said circuit for shutting off the inlet and outlet gas flow, said circuit further including four two-way solenoid valves 15, 16, 17 and 18 respectively, of the normally closed type, which operate to adjust or control the gas filling and discharging steps of the mentioned metering chambers so as to provide the desired operating cycle. Each pair of solenoid valves 15, 17 and 16, 18 being intercoupled by respective fitting assemblies, of which only the fitting assembly 17' is shown in FIG. 2.

Downstream of the mentioned circuit 10 there is moreover provided a fitting 19 for coupling with the corresponding fitting (not shown) for filling at least a gas cylinder or bottle mounted on a motor vehicle.

The metering device according to the present invention further comprises a computer or processor 20, with a related built-in power supply, for processing the electric signals sent by said load measuring cells so as to control the device operating cycle ans send the results to a plurality of digital displays 21.

These displays, in particular consist of four displays and provide for a read out of the following data:
the pressure in the fueling circuit;
the cost of a single gas unit;
the number of the volume or weight units filled from the metering chamber in the gas cylinder mounted on the motor vehicle;
the total cost amount of the supplied volume or weight units.

A keyboard 22 is moreover provided coupled to the processor 20 and, including at least three push buttons 22' for clearing previous data; starting the fueling operation; providing, on the related digital display 21, instead of the pressure in said circuit 10, a read out of the value of the gas specific weight, relating to the metered gas (which value will be preliminary set in the processor as volume units must be supplied).

The metering device according to the invention further comprises a pressure transducer 23 adapted to sense the pressure in the gas supplying circuit 19.

For fueling the gas cylinder the fueling flexible hose must be coupled to the fitting for filling said cylinder; then the clearing push button of the keyboard 22 must be depressed for clearing the previous fueling data and simultaneously reading, on one of the digital displays 21, the residual gas supplying pressure.

In particular there are provided a plurality of coded combination microswitches (not shown) for switching on, within sufficiently broad limits, the gas specific weight value, which will depend on possible variations of the composition of said gas (for example natural gas may also contain carbon dioxide, nitrogen, higher hydrocarbons and so on, even if in trace amounts). These microswitches, which are included in the processor board 20, can be accessed by the gas supply system owner in order to set, for example, the gas selling price.

In this connection it should be apparent that the combination code may also be extended at will to higher or lower values than the expected values, as the metering device according to the invention must be used for metering other gases (such as oxygen, carbon dioxide, nitrogen, hydrogen, argon and the like).

Supposing that the pressure of the metering chambers and cylinders to be fueled is the barometric pressure, a dead period of about five seconds occurs in the operation of the subject metering device.

After this period, which can be changed by operating a trimmer associated with the processor 20, and which is provided for dampening possible vibrations, said processor will open the solenoid valve 15 so as to cause the gas to flow into the chamber 1.

Simultaneously, the load measuring cell 1 will have sent to said processor its weighing signal which, if the chamber is completely empty, will have a zero value.

On the other hand, if a previous fueling has been made (which will be the most common case), then the sent signal will be high, the sent signals being in each case stored by the processor.

As a time of 10 s has elapsed (or any other set times), the processor will call a further signal from the cell and, if the difference of the two signals corresponds to a weight greater than 10g (or any other set weight), then said processor will hold the solenoid valve 15 open. and its inner pressure will be continuously increased, and the cell 11, each 10s or other set time, will supply the processor with its signal.

This condition will be held as far as the pressure differential between the storage tank and metering chamber reaches such a value that, at a set time, the supplied gas amount is less than 10g, or any other preset value.

At this time, the processor will close the solenoid valve 15 and, after a dead period corresponding to few seconds, said processor will open the solenoid valve 16 so as to allow for gas to flow into the metering chamber 2.

As the weight of this metering chamber increases, as sensed by its load measuring cell 12, signal trains will be sent to the processor 20, in the same manner as the metering chamber 1.

Simultaneously, the processor will open the solenoid valve 17 which will communicate the metering chamber 1, the pressure of which is now slightly less than that of the storage tank, with the cylinder mounted on the motor vehicle.

In actual practice, the above mentioned cycles will be repeated in a continuous way during the several operating steps of the metering device that is the filling step, weighing step and transfer step, in an alternating way.

In other words, as the chamber 1 is filled, the chamber 2 transfers its contents to the cylinder to be fueled and, vice versa, as the chamber 2 is filled, the chamber 1 will transfer its contents to the cylinder.

In this connection it should be pointed out that as the gas amount transferred from the storage tank to a metering chamber is less than the set amount, then the processor 20 will operate the solenoid valves in a reverse way so as to cause the fueling gas to fill the other metering chamber.

However if, during this step, the gas amount being supplied is less than the set amount, then the processor will interrupt the operation, thereby the cylinder supply is ended.

In this connection it should be moreover pointed out that the fueling operation can also be interrupted, in an emergency case, by operating a suitable push button of said keyboard 22.

Signalling lamps are furthermore provided for monitoring the proper operation of the metering device.

It should be moreover pointed out that the processor will be designed so as to accept a preselection by a total amount in given value banknotes and it may be interfaced with known automatic refueling devices like those used in automatic refueling systems.

The metering data may be obviously read out by light emitting digital displays, optical or magnetic displays or monitors and this data may also be sent to a remote recording central unit.

Finally a printing device can be associated with the metering device according to the invention.

While the invention has been disclosed and illustrated with reference to a preferred embodiment thereof, it should be apparent that the disclosed embodiment is susceptible to several modifications and variations all of which will come within the spirit and scope of the appended claims.

We claim:
1. A gas mass metering device comprising a frame supporting at least two metering chambers, a counterweight associated to each of said at least two metering chambers, a yoke member disposed in between a respective one of said at least two chambers and said counterweight for balancing and supporting each respective one of said at least two metering chambers and counterweight, at least two load measuring cells, each of said at least two load measuring cells located underneath and supporting a respective chamber of said at least two chambers, a plurality of solenoid valves adapted to control the entrance and exit of gas in said at least two metering chambers, processor means for controlling said plurality of solenoid valves, each of said at least two metering chambers defining an enclosed volume with a single opening, and at least two flexible hoses each having two ends with the first end connected to said plurality of solenoid valves and the second end connected to said single opening in a respective one of said at least two metering chambers wherein said at least two flexible hoses are provided for filling gas in said at least two metering chambers and for removing gas therefrom wherein said chambers alternatively operate with a filling step in which one of said chambers is filled with gas and a fueling step in which the other of said chambers supplies gas contained therein.

2. A gas mass metering device according to claim 1, wherein each of said at least two load measuring cells is slidingly supported on said frame of said metering device to be adjusted so as to provide a precise electric signal indicative of said gas mass in each said chamber.

* * * * *